United States Patent [19] [11] 4,292,860
Kako et al. [45] Oct. 6, 1981

[54] TRANSFER DEVICE ASSOCIATED WITH POWER TRANSMISSION

[75] Inventors: Hiroyoshi Kako; Hajime Arai, both of Aichi, Japan

[73] Assignee: Toyota Jidosha Kogyo Kabushiki Kaisha, Aichi, Japan

[21] Appl. No.: 965,335

[22] Filed: Dec. 1, 1978

[30] Foreign Application Priority Data

Apr. 20, 1978 [JP] Japan .................. 53-47335

[51] Int. Cl.$^3$ ............ F16H 3/08; F16H 37/06; B60K 17/34
[52] U.S. Cl. .................. 74/665 GA; 74/373; 180/247
[58] Field of Search ......... 180/245, 247; 74/357, 74/359, 745, 360–363, 665 F, 665 G, 665 GA, 665 T, 373

[56] References Cited

U.S. PATENT DOCUMENTS

| | | | |
|---|---|---|---|
| 2,362,925 | 11/1944 | Peterson et al. | 74/745 X |
| 2,853,890 | 9/1958 | Kelbel | 74/665 GA |
| 2,971,595 | 2/1961 | Fabere et al. | 180/247 |
| 3,221,574 | 12/1965 | Sampietro et al. | 74/665 GA |
| 3,354,745 | 11/1967 | De Castelet | 74/665 GA |
| 3,470,766 | 10/1969 | Magg et al. | 74/665 GA |

FOREIGN PATENT DOCUMENTS

| | | | |
|---|---|---|---|
| 278125 | 5/1965 | Australia. | |
| 288316 | 8/1965 | Australia. | |
| 32244 | 7/1969 | Australia. | |
| 1327161 | 4/1963 | France | 74/665 T |
| 2281524 | 3/1976 | France | 74/665 GA |

Primary Examiner—Allan D. Herrmann
Attorney, Agent, or Firm—Stevens, Davis, Miller & Mosher

[57] ABSTRACT

A transfer device associated with a power transmission unit includes an input shaft for connection to an output shaft of the transmission unit, a first output shaft axially aligned with the input shaft, a second output shaft located parallely apart from the input and first output shafts, a change-speed gearing arranged among the input shaft and the first and second output shafts, and a selector gear unit assembled with the change-speed gearing for selectively completing low and high speed gear trains. In the transfer device, a second gear unit is assembled adjacent to the first-named selector gear unit on a common axis to selectively provide the rear wheel drive and the front and rear wheel drive.

2 Claims, 7 Drawing Figures

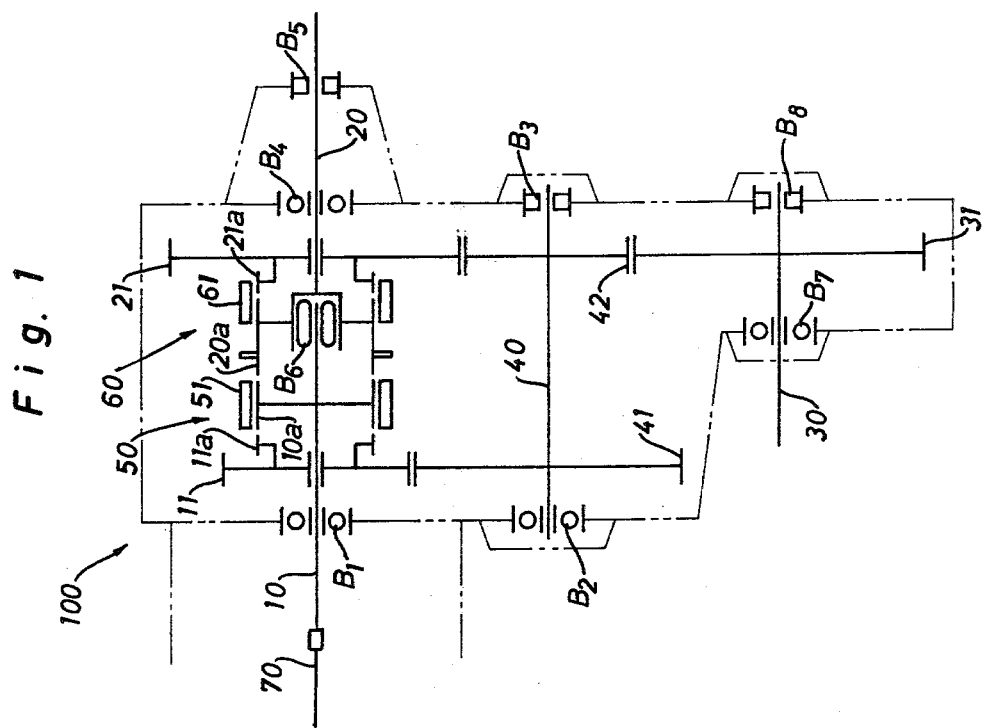

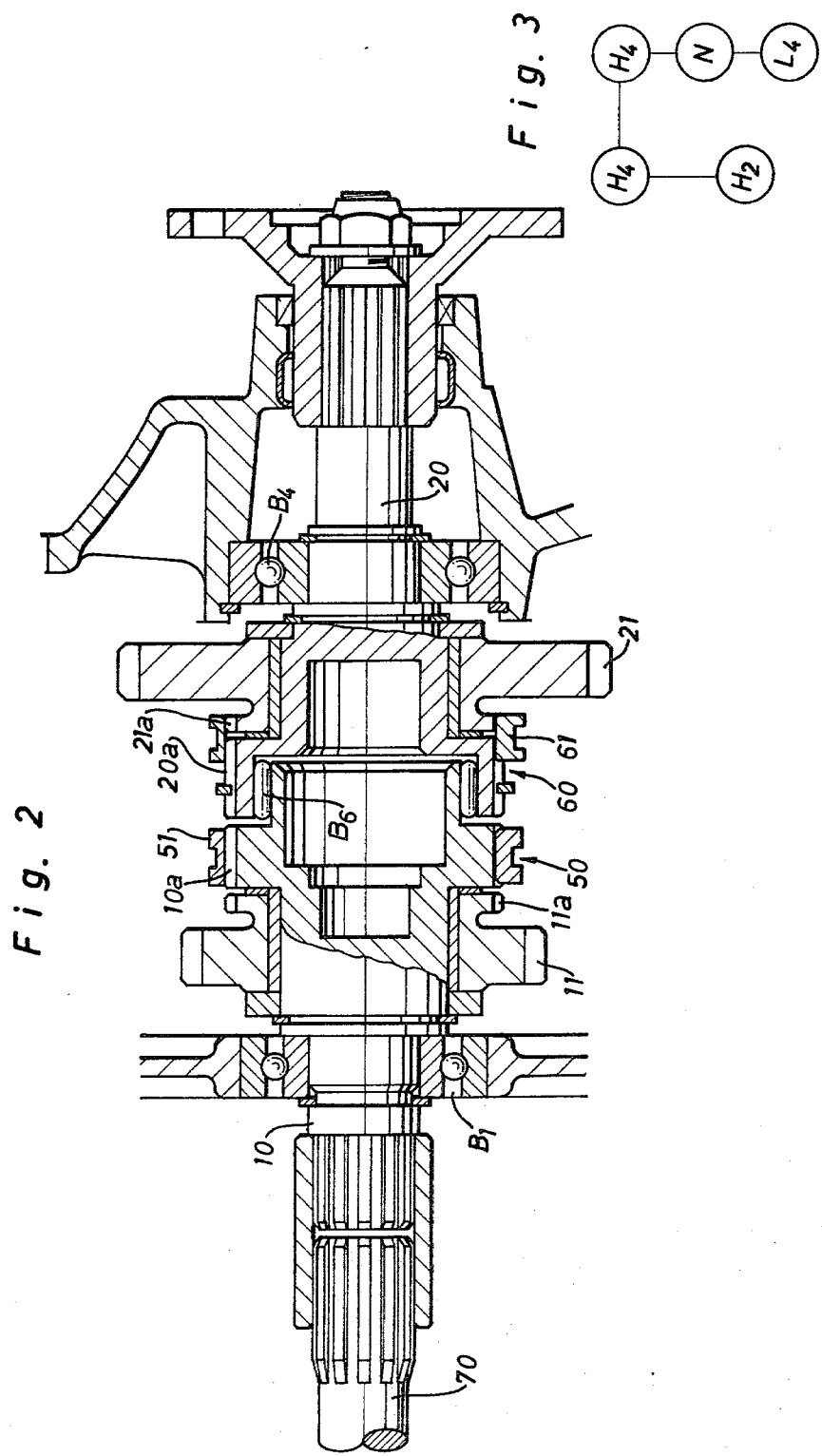

TRANSFER DEVICE ASSOCIATED WITH POWER TRANSMISSION

BACKGROUND OF THE INVENTION

The present invention relates to a transfer device associated with a power transmission unit for automotive vehicles of front and rear wheel drive type, and more particularly to a transfer device of the type which includes an input shaft for connection to an output shaft of the transmission unit, a first output shaft axially aligned with the input shaft, a second output shaft located parallely apart from the input and first output shafts, and a selector gear unit for selectively completing low and high speed gear trains among the input shaft and the first and second output shafts.

In general, as is seen in FIG. 7, a conventional transfer device of the type includes an input shaft 1 for connection to an output shaft of a power transmission unit, a first output shaft 2 coaxially connected at its inner end with the input shaft 1 by means of a bearing to permit relative rotation of the shafts 1 and 2, and a second output shaft 3 located parallely apart from the input and first output shafts. A high speed drive gear 1a is integral with the input shaft 1 and in mesh with a high speed counter-gear 4a on a countershaft 4. The high speed counter-gear 4a is permanently meshed with a high speed output gear 3a rotatable on the second output shaft 3, the output gear 3a having the same number of teeth as those of the high speed drive gear 1a. A low speed drive gear 2a is freely rotative on the first output shaft 2 and in mesh with a low speed counter-gear 4b on countershaft 4. The low speed counter-gear 4b is permanently meshed with a low speed output gear 3b rotatable on the second output shaft 3, the output gear 3b having the same number of teeth as those of the low speed drive gear 2a.

The transfer device further includes a first selector gear unit 5, which is coaxially arranged with the input and first output shafts to selectively connect the first output shaft 2 with the low and high speed drive gears 2a and 1a, and a second selector gear unit 6, which is coaxially arranged with the second output shaft 3 to selectively connect the second output shaft 3 with the low and high speed output gears 3b and 3a. To drive the front and rear wheels at a low speed, both the selector gear units 5 and 6 are shifted to connect the first output shaft 2 with the low speed drive gear 2a and to connect the second output shaft 3 with the low speed output gear 3b. To drive the front and rear wheels at a high speed, both the selector gear units 5 and 6 are also shifted to connect the first output shaft 2 with the high speed drive gear 1a and to connect the second output shaft 3 with the high speed output gear 3a. For switching-over the front and rear wheel drive to the rear wheel drive, only the second selector gear unit 6 is returned to its neutral position.

In such a transfer device as described above, the second selector gear unit 6 is located apart from the first selector gear unit 5. As a result, the shifting mechanism for the selector gear units is complicated in construction and occupies a large space within the transfer device. Additionally, when the transfer device is shifted from the rear wheel drive to the front and rear wheel drive or from the low speed range to the high speed range, both the first and second selector gear units must be shifted at the same time. Furthermore, during operation of the transfer device, all the gears 1a, 2a, 3a, 3b, 4a and 4b are always driven to cause unnecessary torque losses by stirring of lubricating oil and frictional resistances.

SUMMARY OF THE INVENTION

It is, therefore, a primary object of the present invention to provide an improved transfer device in which the first selector gear unit is assembled adjacent to the second selector gear unit on a common axis to simplify the construction of the shifting mechanism and to ensure smooth shifting manipulation.

Another object of the present invention is to provide an improved transfer device in which all assembled gears are arrested when the transfer device is conditioned to drive only the rear wheels in the high speed range.

Still another object of the present invention is to provide an improved transfer device in which the number of assembled gears is reduced less than that of the conventional transfer device described above.

According to the present invention, there is provided a transfer device associated with a power transmission unit for an automotive vehicle which comprises an input shaft for connection to an output shaft of the transmission unit, a first output shaft rotatably coupled at the inner end thereof with the input shaft, a countershaft arranged in parallel with the input and first output shafts and being integrally provided with low and high speed counter-gears, a second output shaft arranged in parallel with the countershaft and being integrally provided with an output gear meshing with the high speed counter-gear, a low speed drive gear rotatable on the input shaft and being in mesh with the low speed counter-gear, a high speed drive gear rotatable on the first output shaft and being in mesh with the high speed counter-gear, the high speed drive gear having the same number of teeth as those of the output gear, a first selector gear unit mounted on the input shaft for selectively connecting the input shaft to the low speed drive gear and the first output shaft to complete low or high speed gear train, and a second selector gear unit mounted on the first output shaft for connecting the high speed drive gear to the first output shaft to provide front and rear wheel drive and disconnecting the high speed drive gear from the first output shaft to provide only rear wheel drive.

BRIEF DESCRIPTION OF THE DRAWINGS

Additional objects and advantages of the present invention will be more readily apparent from the following detailed description of a preferred embodiment thereof when taken together with the accompanying drawings in which:

FIG. 1 is a schematic skeleton view of a transfer device in accordance with the present invention;

FIG. 2 is a sectional view of an embodiment of the first and second selector gear units shown in FIG. 1;

FIG. 3 illustrates a shift pattern of the selector gear units of FIG. 1;

DESCRIPTION OF THE PREFERRED EMBODIMENT

Figure 4:
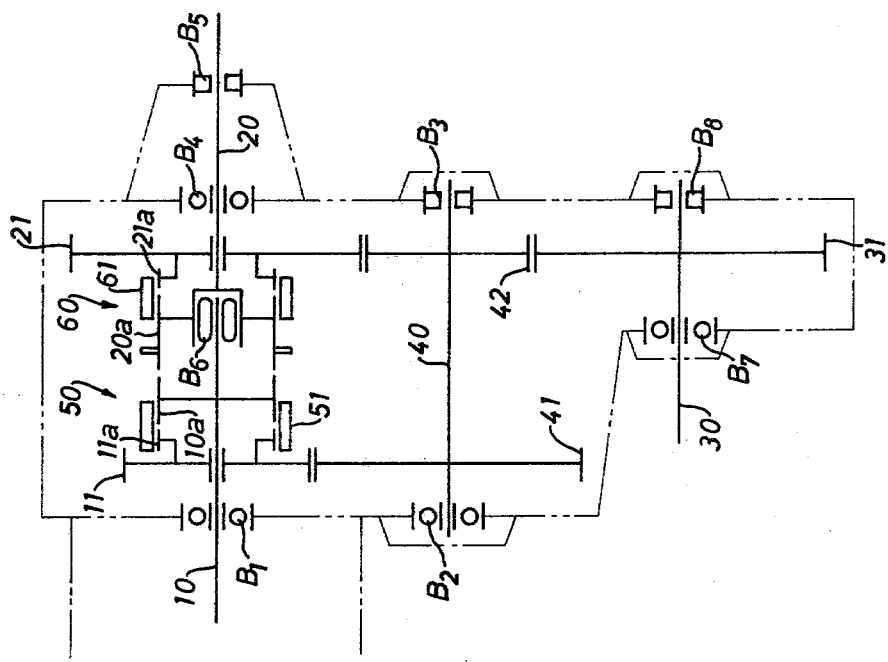
FIGS. 4, 5 and 6 illustrate the mode of operation of the transfer device.

Referring now to FIGS. 1 and 2 of the drawings, a transfer device 100 of the present invention is provided with an input shaft 10 which is operatively connected with an output shaft 70 of a power transmission unit (not shown) by means of a spline coupling. The input shaft 10 is rotatably supported by a bearing $B_1$ from a transfer casing and is integrally provided with a clutch hub 10a. A low speed drive gear 11 is rotatable on the input shaft 10 and is integrally formed with a set of external clutch teeth 11a alignable with external clutch teeth of the clutch hub 10a. A countershaft 40 is rotatably supported by a pair of bearings $B_2$ and $B_3$ from the transfer casing and is arranged in parallel with the input shaft 10. The countershaft 40 is integrally formed with low and high speed counter-gears 41 and 42, the former gear 41 being in mesh with the low speed drive gear 11.

A first output shaft 20 for rear wheel drive is rotatably supported by a pair of bearings $B_4$ and $B_5$ from the transfer casing and is coaxially connected at its inner end with the input shaft 10 by means of a bearing $B_6$ to permit free rotation relative to the input shaft 10. Furthermore, the first output shaft 20 is integrally provided at its inner end with a clutch hub 20a. A high speed drive gear 21 rotatable on the output shaft 20 is permanently meshed with the counter-gear 42 and is integrally formed with a set of external clutch teeth 21a alignable with external clutch teeth of the clutch hub 20a. A second output shaft 30 for front wheel drive is rotatably supported by a pair of bearings $B_7$ and $B_8$ from the transfer casing and is integrally formed with an output gear 31 which is permanently meshed with the counter-gear 42. The output gear 31 has the same number of teeth as those of the high speed drive gear 21.

A first selector gear unit 50 is provided to selectively complete low and high speed gear trains in the transfer device. The selector gear unit 50 includes a clutch hub sleeve 51 with internal clutch teeth which is operatively connected with a first shift fork (not shown) to be shifted by a single operator's lever as described hereinafter. When the clutch hub sleeve 51 is displaced by the first shift fork in a leftward direction, it is brought into engagement with the clutch teeth of the low speed drive gear 11 and clutch hub 10a to connect the drive gear 11 with the input shaft 10. When the clutch hub sleeve 51 is displaced by the first shift fork in a rightward direction, it is brought into engagement with the clutch teeth of clutch hubs 10a and 20a to directly connect the input shaft 10 with the first output shaft 20.

The transfer device is further provided with a second selector gear unit 60 which serves to selectively provide two wheel drive and four wheel drive. The selector gear unit 60 is assembled coaxially with the first selector gear unit 50 and is located adjacent to the same to simplify the construction of the transfer device. The selector gear unit 60 includes a clutch hub sleeve 61 with internal clutch teeth which is operatively connected with a second shift fork (not shown) to be shifted by the operator's lever as described later. The clutch hub sleeve 61 is normally engaged with the clutch teeth of clutch hub 20a and high speed drive gear 21 to provide a drive connection between the high speed drive gear 21 and the first output shaft 20. When the clutch hub sleeve 61 is displaced by the second shift fork in a leftward direction, it is disengaged from the clutch teeth 21a of high speed drive gear 21.

In FIG. 3, there is illustrated a shift pattern of the operator's lever to selectively shift the first and second shift forks. When the operator's lever is moved from a neutral position N to a low speed position $L_4$, the first shift fork is shifted to engage the clutch hub sleeve 51 with the clutch teeth of clutch hub 10a and low speed drive gear 11. When the operator's lever is moved from the neutral position N to a right-hand high speed position $H_4$, the first shift fork is shifted to engage the clutch hub sleeve 51 with the clutch hubs 10a and 20a. In case the operator's lever is moved from the right-hand position $H_4$ to a left-hand high speed position $H_4$, it is disconnected from the first shift fork and connected with the second shift fork. In this instance, the engagement of the clutch hub sleeve 51 with the clutch hubs 10a, 20a is remained. Thereafter, when the operator's lever is moved from the left-hand position $H_4$ to a second high speed position $H_2$, the second shift fork is shifted to disengage the clutch hub sleeve 61 from the clutch teeth 21a of high speed drive gear 21. In the above-noted shift pattern, the characters $L_4$ and $H_4$ respectively indicate low and high speeds for four wheel drive, and the character $H_2$ indicates a high speed for two wheel drive.

In operation of the transfer device 100, when the operator's lever is in the neutral position N, the clutch hub sleeve 51 is engaged only with the clutch hub 10a, while the clutch hub sleeve 61 is engaged with the clutch teeth of clutch hub 20a and high speed drive gear 21. In this condition, the first and second output shafts 20 and 30 are free from the input shaft 10 to permit free rotation of the input shaft 10. When the operator's lever is moved from the neutral position N to the low speed position $L_4$ to engage the clutch hub sleeve 51 with the clutch teeth of clutch hub 10a and low speed drive gear 11, as shown in FIG. 4, the rotation torque of input shaft 10 is conveyed to the high speed counter-gear 42 by way of the gears 11, 41 and the countershaft 40. Then, the rotation torque is transmitted to the first output shaft 20 by way of the gear 21 and the second selector gear unit 60 and is further transmitted to the second output shaft 30 by way of the gear 31. Thus, the output shafts 20 and 30 are driven at a reduction speed ratio to complete a low speed gear train, the speed ratio being determined by the gears 11, 21, 31, 41 and 42.

Figure 5:
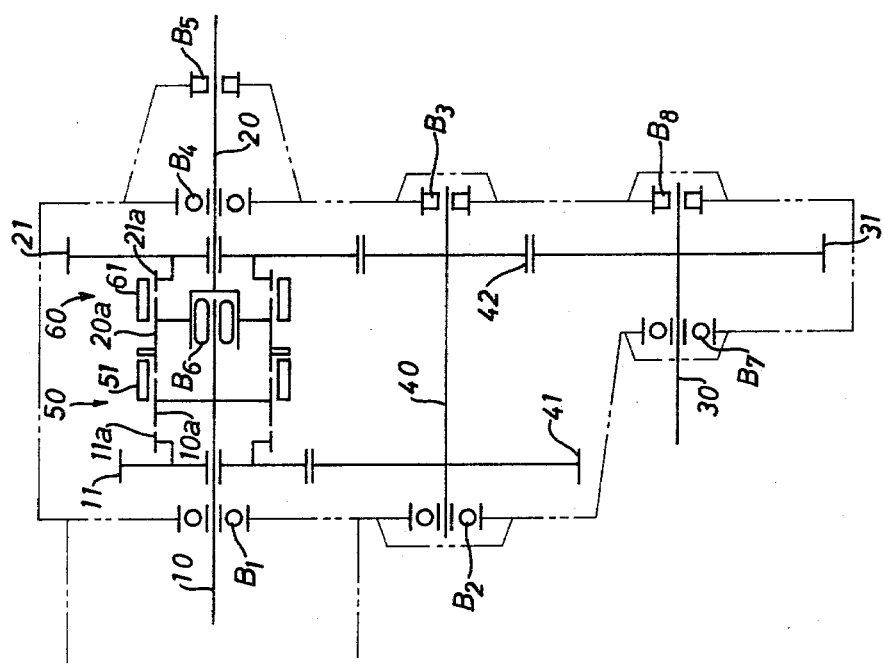

When the operator's lever is shifted from the neutral position N to the right-hand high speed position $H_4$ to engage the clutch hub sleeve 51 with the clutch hubs 10a and 20a, as shown in FIG. 5, the rotation torque of input shaft 10 is directly transmitted to the first output shaft 20 and is further transmitted to the second output shaft 30 by way of the second selector gear unit 60, the gears 21, 42 and 31. Thus, the first and second output shafts 20 and 30 are driven at the same speed as that of the input shaft 10 to complete a high speed gear train.

Figure 6:
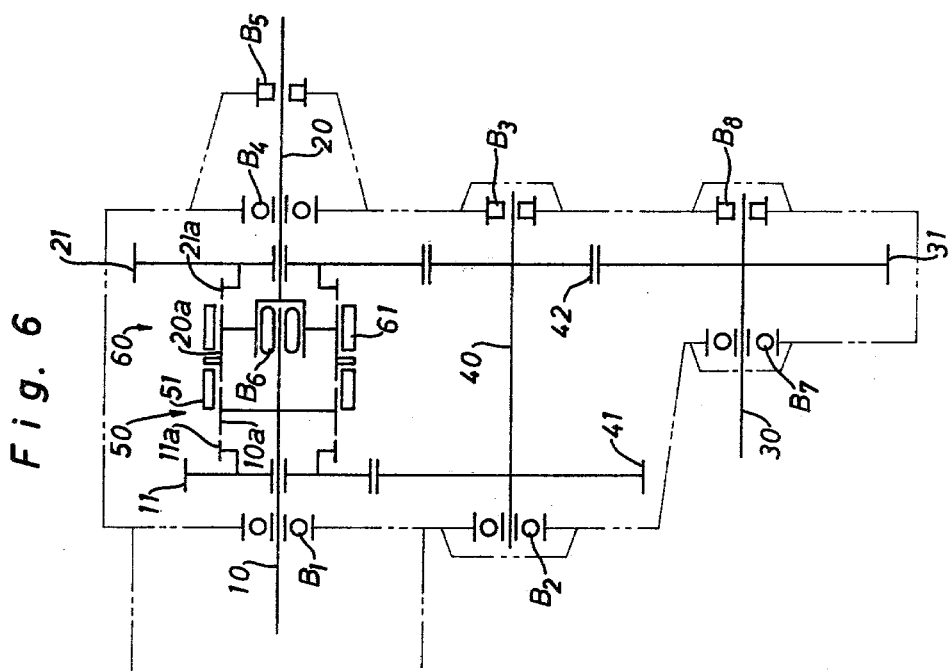
Figure 7:
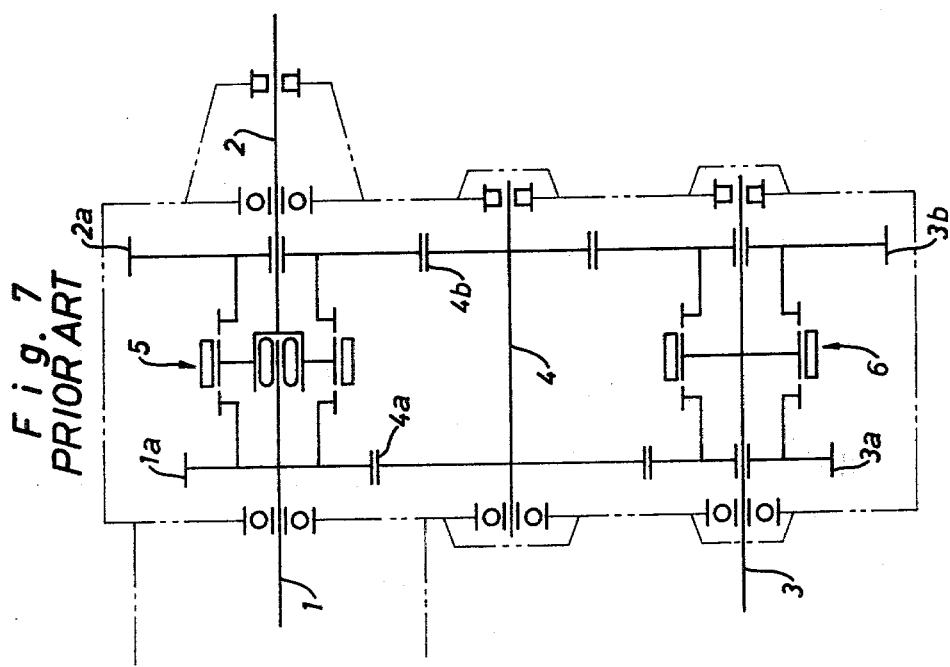
FIG. 7 is a schematic skeleton view of a conventional transfer device.

When the operator's lever is shifted from the left-hand high speed position $H_4$ to the second high speed position $H_2$, the clutch hub sleeve 61 of second selector gear unit 60 is separated from the clutch teeth 21a of gear 21 to permit free rotation of the gear 21 on the first output shaft 20, as shown in FIG. 6. Thus, the rotation torque of input shaft 10 is transmitted only to the first output shaft 20 by way of the first selector gear unit 50 to provide two wheel drive, and the torque transmission to the second output shaft 30 is disconnected to permit free rotation of the second output shaft 30. In this case, if a conventional free-wheel hub clutching mechanism is adapted to the front axles of the vehicle, all the gears 11, 21, 31, 41 and 42 are arrested by setting the hub clutching mechanism in a free position, thereby eliminating unnecessary torque losses in the transfer device 100.

Although a certain specific embodiment of the present invention has been shown and described, it is obvious that many modifications and variations thereof are possible in light of these teachings. It is to be understood therefore that within the scope of the appended claims, the invention may be practiced otherwise than as specifically described herein.

What is claimed is:

1. In a transfer device associated with a power transmission unit for an automotive vehicle, comprising:

an input shaft for connection to an output shaft of said transmission unit;

a first output shaft rotatably coupled at the inner end thereof with said input shaft;

a countershaft arranged in parallel with said input and first output shafts and being integrally provided with low and high speed counter-gears;

a second output shaft arranged in parallel with said countershaft and being integrally provided with an output gear meshing with said high speed counter-gear;

a low speed drive gear rotatable on said input shaft and being in mesh with said low speed counter-gear; and a high speed drive gear rotatable on said first output shaft and being in mesh with said high speed counter-gear, said high speed drive gear having the same number of teeth as those of said output gear;

the improvement comprising:

first and second selector gear units arranged adjacent to each other on a common axis between said low and high speed drive gears, said first selector unit being mounted on said input shaft for selectively connecting said input shaft to said low speed drive gear or to said first output shaft; and said second selector gear unit being mounted on the inner end of said first output shaft for connecting said high speed drive gear to said first output shaft to provide four wheel drive and for disconnecting said high speed drive gear from said first output shaft to provide two wheel drive.

2. A transfer device associated with a power transmission unit as claimed in claim 1, wherein said first selector gear unit comprises a first clutch hub integral with said input shaft and having external clutch teeth thereon, a first set of external clutch teeth integral with said low speed drive gear, a second clutch hub integral with the inner end of said first output shaft and having external clutch teeth thereon, and a first clutch hub sleeve axially displaceable on the external clutch teeth of said first clutch hub to be engaged with the external clutch teeth of said low speed drive gear and said second clutch hub, or wherein said second selector gear unit comprises a second set of external clutch teeth integral with said high speed drive gear, and a second clutch hub sleeve axially displaceable on the external clutch teeth of said second clutch hub to be engaged with the external clutch teeth of said high speed drive gear.

* * * * *